United States Patent [19]
Habiger et al.

[11] 3,918,259
[45] Nov. 11, 1975

[54] HORSEPOWER-LIMITING VALVE AND LINKAGE THEREFOR

[75] Inventors: Cyril W. Habiger; Donald L. Hopkins, both of Joliet, Ill.

[73] Assignee: Caterpillar Tractor Company, Peoria, Ill.

[22] Filed: Aug. 26, 1974

[21] Appl. No.: 500,326

[52] U.S. Cl. .................. 60/445; 60/452; 60/488; 417/212
[51] Int. Cl.² .................................. F16H 39/46
[58] Field of Search ............ 60/389, 393, 433, 434, 60/445, 448, 451, 452, 459, 465, 488, 489, 493; 417/212, 213

[56] References Cited
UNITED STATES PATENTS

| | | | |
|---|---|---|---|
| 2,932,948 | 4/1960 | Neff et al. | 60/452 X |
| 3,017,750 | 1/1962 | Kempson | 60/389 |
| 3,213,617 | 10/1965 | Hallberg | 60/389 |

Primary Examiner—Edgar W. Geoghegan
Attorney, Agent, or Firm—Phillips, Moore, Weissenberger Lempio & Strabala

[57] ABSTRACT

A hydrostatic transmission having a variable displacement axial piston pump is provided with control means for controlling the displacement of the pump. The control means include servo-means having a manually operable valve means for normally establishing the displacement of the pump, and includes pressure-responsive actuator means operatively connected to the control means to override the manually selected position in response to pressure load in the system determined by the load imposed on the output of the hydraulic motor.

10 Claims, 3 Drawing Figures

HORSEPOWER-LIMITING VALVE AND LINKAGE THEREFOR

BACKGROUND OF THE INVENTION

The present invention relates to hydrostatic transmissions and pertains particularly to load-responsive control for such hydrostatic transmissions.

Hydrostatically powered vehicles normally have an over-center variable displacement pump with the speed of the vehicle being controlled by manually changing the angle of the swash plate, either singularly or in combination with changing engine speed. One of the problems with this arrangement is that under lug conditions such as ascending a hill, the natural tendency of the operator is to depress the speed control pedal, similar to depressing the accelerator pedal in a normal vehicle. However, in so doing, the angle of the swash plate is increased, resulting in a volumetric increase in the output of the pump. This increases the horsepower necessary to drive the pump, and frequently exceeds the available horsepower of the engine, causing the vehicle engine to stall. Moreover, even when the swash plate angle is not changed during lug conditions, the output pressure of the fluid from the pump may increase sufficiently to stall the engine. A number of systems or different approaches to systems for reducing pump output in response to load are known. However, most of these systems are quite complicated and somewhat unreliable.

Examples of known prior art are as follows: U.S. Pat. No. 2,750,862 issued June 19, 1956 to Garmager; U.S. Pat. No. 3,078,674 issued Feb. 26, 1963 to Anderson; U.S. Pat. No. 3,191,382 issued June 29, 1965 to Weisenbach; U.S. Pat. No. 3,738,779 issued June 12, 1973 to Hein et al., and assigned to the assignee hereof.

SUMMARY AND OBJECTS OF THE INVENTION

It is a primary object of the present invention to provide control means that is responsive to the output pressure of a variable displacement pump to vary or control the displacement thereof.

It is a further object of the present invention to provide a variable displacement pump and a pressure-responsive compensator means that is responsive to the output load on the pump to vary the displacement of the pump in response to a load.

It is another object of the present invention to provide a variable displacement pump with pressure-responsive control means that is automatically operative to reduce the displacement of the pump in response to excessive load imposed thereon. In accordance with the primary aspect of the present invention, a servo-valve that is operative to manually selectively position the displacement of a variable displacement pump is interconnected by control means to a pressure-responsive actuator that is responsive to the pressure imposed on the pump output to operate the servo-valve means to reduce the displacement of the variable displacement pump.

DETAILED DESCRIPTION OF PREFERRED EMBODIMENTS

Figure 1:
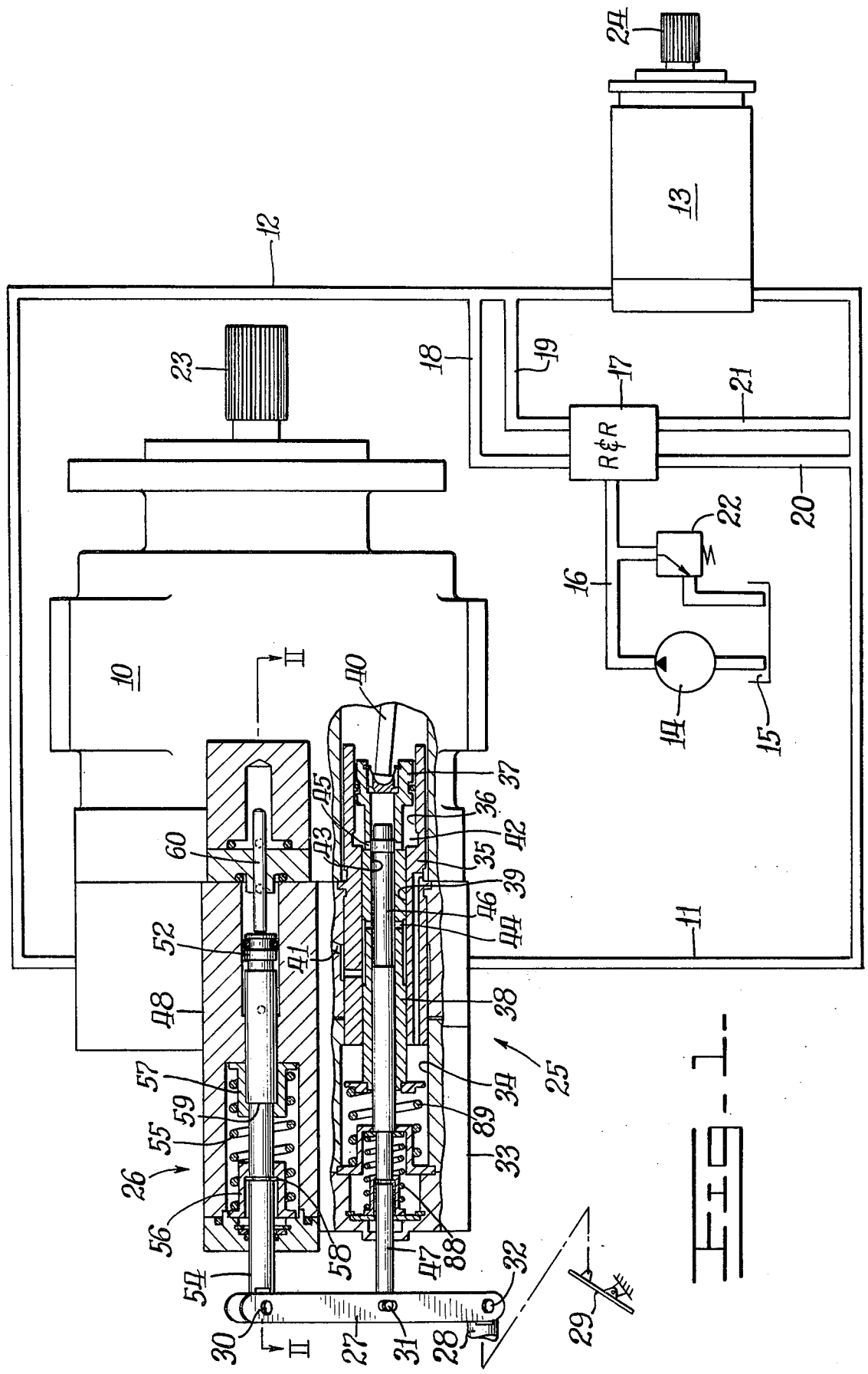
FIG. 1 is a schematic layout of a hydrostatic transmission including a sectional view of the control valve and actuator of the present invention.

Turning now to the drawings and particularly to FIG. 1, there is illustrated a schematic layout of a hydrostatic transmission comprising an axial piston variable displacement pump 10 which is operatively connected by means of suitable conduit means 11 and 12 for open and continuous communication with a rotary fluid motor 13. The motor 13 may be variable displacement or not, as preferred.

A charging pump 14 draws fluid from a reservoir or tank 15 and supplies the fluid through a conduit 16 to a combined replenishing and relief valve 17 for replenishing fluid lost from the system due to normal leakage. The replenishing valve 17 is operatively connected by means of conduits 18 and 19 to the conduit 12 and by conduits 20 and 21 to conduit 11. A relief valve 22 is operatively connected to protect the pump 14 and its supply system.

The transmission includes an input shaft 23 and an output shaft 24. The input shaft 23 drives the pump 10 and is normally connected to the engine of the vehicle, whereas the output shaft 24 will be connected in a suitable manner to the drive wheels of the vehicle. The output of the transmission itself will be determined by the displacement of the variable displacement pump 10. The pump 10 is preferably an over-center swash-plate type wherein the swash plate of the pump pivots over center for forward and reverse of the transmission. Neutral or non-output of the transmission would be achieved by non-displacement of the swash plate, resulting in no flow of fluid to the motor.

The displacement of the pump itself is controlled by suitable control means comprising a servo-actuator generally designated by the numeral 25 and a horsepower-limiting actuator which may also be termed a pressure-responsive actuator designated generally by the numeral 26 disposed adjacent to the servo-actuator. The servo-actuator and the horsepower-limiting actuator are interconnected by linkage means including a lever 27 connected by suitable linkage 28 to a manual control lever or pedal 29 which is manipulated by the vehicle operator.

As will be noted, the lever 27 is pivotally connected at 30 to the horsepower-limiting actuator and at 31 to the servo-actuator and at 32 to the manual control lever or pedal 29. The servo-actuator connection 31 is between the horsepower-limiting pivotal connection 30 and linkage connection 32 and the horsepower-limiting linkage connection 30 defines a movable or floating fulcrum means for the lever 27. This movable or moving fulcrum means will be discussed in more detail later.

The servo-actuator 25 comprises a housing 33 which may or may not be part of the pump housing as preferred, which housing includes a cylindrical bore 34 formed therein. A sleeve 35 is mounted within bore 34 and includes a bore 36 in which is reciprocally mounted a piston 37 having an extension or sleeve portion 38 mounted in bore 39 of sleeve 35. The piston 37 is operatively connected by means of a link 40 to the swash plate of the pump 10 for adjusting the tilt thereof. Suitable conduit means 41 provide a passageway for the introduction of actuating or pressurized fluid for the actuation of the piston 37 by introduction of said fluid into chamber 42.

The sleeve 38 includes a central bore 43 having a port 44 communicating with the inlet conduit 41 and a port 45 communicating with chamber 42. A valve 46 is disposed within the bore 43 for operatively controlling the communication of fluid between the inlet port 44 and the outlet port 45. The valve 46 includes a stem 47 which is pivotally connected at 31 to the control lever 27. A centering spring 89 is operatively connected to resist movement of the sleeve portion and piston 37 to the left. A centering spring 88 is operative to return the stem 47 to a neutral position upon release of the actuating force applied thereto through the lever 27.

For normal operation, movement of control linkage 28 to the right pivots lever 27 about pivot point 30, moving the servo-valve 46 to the right against the action of centering spring 88 causing a change in the displacement of the pump 10 and movement of the fluid from pump 10 by way of conduit 11 for forward drive of motor 13. Movement of valve 46 to the right directs fluid into chamber 42 where it acts on piston 37, which moves rod 40 connected to the swash plate. Fluid exhausted from motor 13 returns by way of conduit 12 to the pump 10.

For reverse operation of the transmission, the lever 27 is moved to the left to shift valve 46 to the left and likewise shift the linkage 40 and the swash plate over center for causing the flow of fluid from pump 10 to flow by way of conduit 12 to the motor 13 and returning therefrom by way of conduit 11. The output shaft 24 then rotates in the reverse direction.

Figure 2:
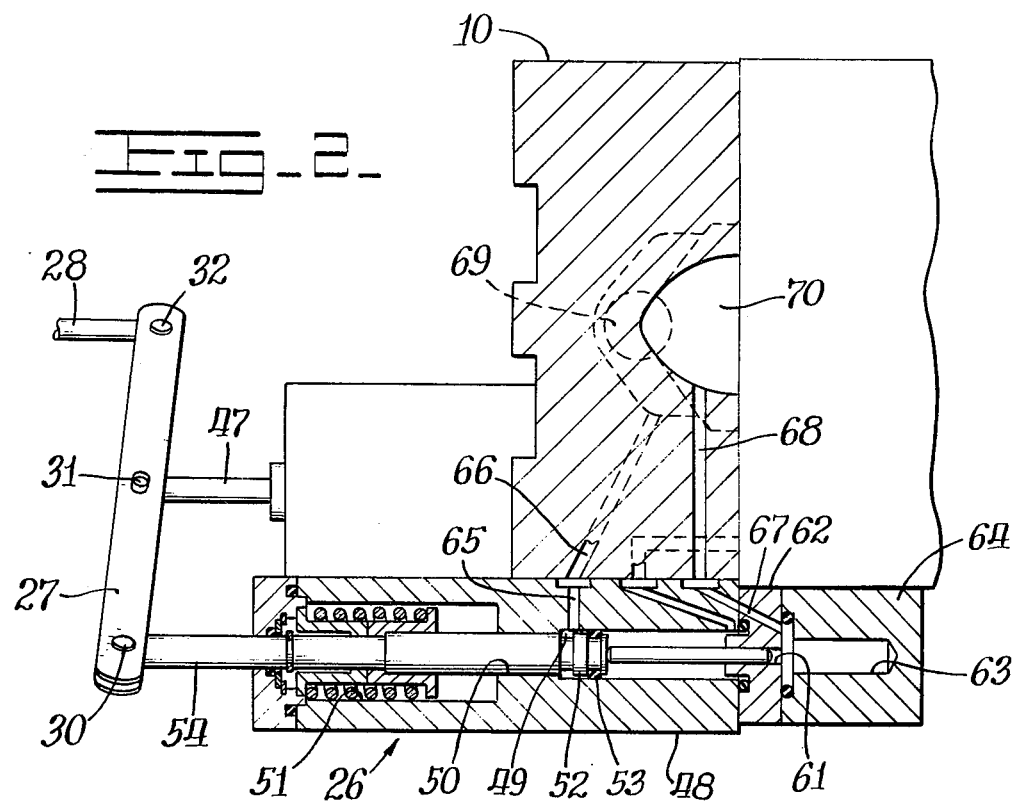
FIG. 2 is a sectional view taken generally along lines II—II of FIG. 1.

The pressure actuator 26, which is best illustrated in FIGS. 1 and 2, includes a housing 48 having a stepped through bore defining a pressure chamber 49, a rod mounting bore 50 and a spring chamber 51. A piston 52 is mounted within the bore 49 defining the pressure chamber, and includes suitable seal means 53 and a rod 54 connecting the piston to lever 27. A centering spring 55 is mounted between a pair of spring seats 56 and 57 within the spring chamber defined by bore 51. The spring seats 56 and 57 abut the ends of the bore or chamber 51 and shoulders defined on rod 54 by means of a ring 58 and a shoulder 59.

A second piston 60 bears on the face of piston 52. This piston is mounted in a bore 61 which is formed either in an extension of the housing 48 or in a second housing 62 which is suitably connected to the first housing 48. The piston 60 extends into a pressure chamber defined by a bore 63 formed in an extension of the previous housings or in another housing 64. The piston 60 is preferably of a diameter to have the same pressure area at the face thereof as the pressure area of the rod end of piston 52. It will be noted that the head end of rod 52 is appreciably larger in area than the rod end. Thus, the piston 60 and the rod end of piston 52 are of suitable areas to balance pressurewise for a given pressure of fluid.

Suitable passageway means 65 formed in housing 48 communicate with passageway 66 formed in the pump housing 48 and communicate with the pump ports. These passageways communicate pressure from one of the motor control lines 11 or 12 to the rod end of piston 52 to move the piston against the centering spring 55 should the pressure therein increase to predetermined levels. A passage 67 communicates with the head end of piston 60 and chamber 63 and communicates fluid by way of a passage 68 with the other of the motor control lines 11 or 12. This arrangement communicates the pressure to operate to force the piston 52 against spring 55 in the opposite direction from that of the previously discussed pressure passages.

The passage 66 communicates with a port 69 and the passageway 68 communicates with a pump port 70. These ports communicate by way of conduits 11 and 12 with the motor 13. These ports 69 and 70 may be either one of inlet or outlet, depending on the inclination of the swash plate of the pump. In other words, it depends on which side of the null or zero position the plate is swiveled.

Figure 3:
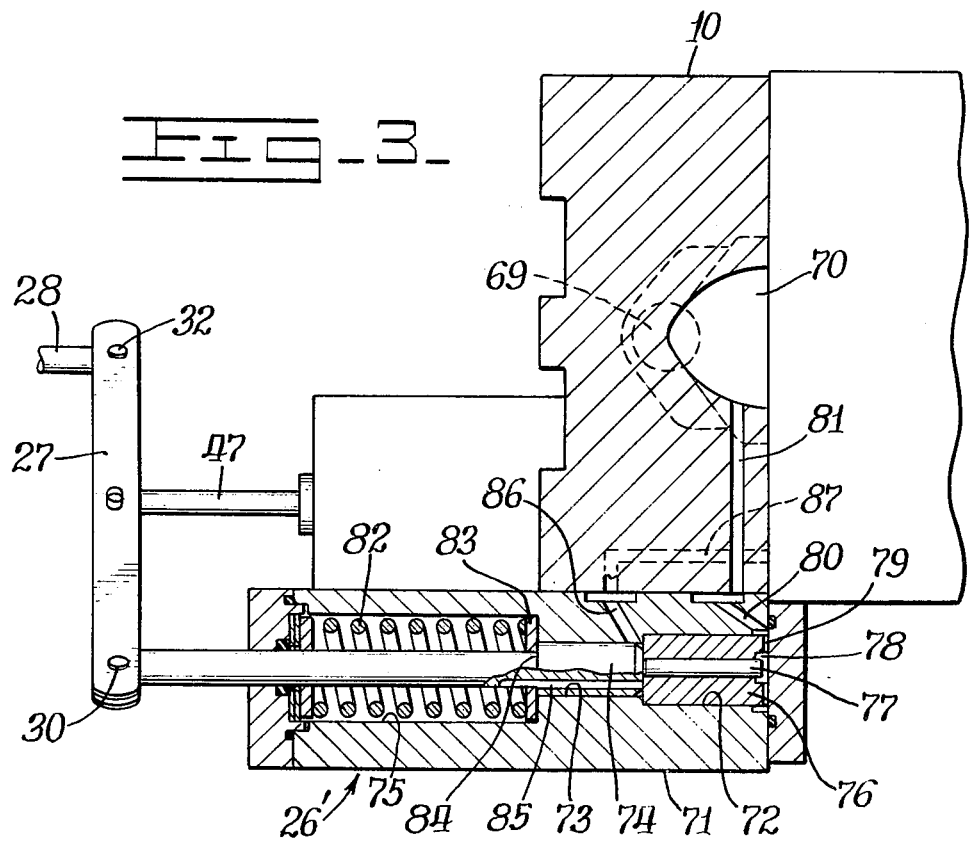
FIG. 3 is a partial sectional view showing an alternate embodiment of the present invention.

Turning now to FIG. 3, there is illustrated an alternate embodiment wherein like or identical elements are identified by the same reference numeral. In this embodiment, a housing 71 includes a central stepped through bore having a first bore 72 which, as explained later, defines the pressure chamber. The second bore 73 is for mounting a plunger 74 and a third bore 75 defines a spring chamber. Mounted within bore 72 is a spacer 76 in which is mounted a piston 77 which abuts the end of plunger 74. The spacer 72 includes a central bore in which is mounted the piston 77 and includes a bore at the end of piston 77 defining a chamber 78 which communicates with the end of piston 77. Suitable radial slots 79 define passageways between the chamber 78 and passage 80 formed in housing 71 which in turn communicates with passage 81 communicating with the pump port 70. A spring 82 is mounted within the bore defined by 75 and is pre-tensioned against a spring seat 83 which engages a shoulder 84 on the plunger 74 to bias the plunger to the rightmost position.

A drain passage 85 communicates between bore 75 and the forward end of plunger 74 which in turn communicates by way of a passage 86 in housing 71 and by way of a passage 87 to the reservoir or sump to vent the respective chambers.

This FIG. 3 embodiment is for a non-over-center pump wherein the swash plate pivots only a single direction from the null or zero displacement position. In this arrangement of a hydrostatic transmission, reverse is obtained by a valve within the control lines between the pump and motor operative to shift the inlet from one motor port to another, to obtain reverse of the transmission. Thus, in this arrangement, the pressure compensating device or actuator 26' is in communication with a single one of the pump ports 70. Thus, with this arrangement the fulcrum point 32 is shifted only in a single direction from its zero or normal position.

Operation

Operation of the present invention can best be understood from a view primarily of FIG. 1. Referring to that figure, when normal pressures exist in the system the rod 54 will be maintained in its centered or a substantially fixed position. This maintains pivot point or fulcrum point 30 for lever 27 in a fixed position such that when an operator operates pedal 29, movement thereof is translated to lever 27 and consequently to valve stem 47 for actuation of servo-valve 46. Movement of servo-valve 46 in a given direction will result in movement of servo-piston 37 which in turn moves the link 40 for swiveling of the swash plate of the pump from zero or null position to a position of displacement. Thus a position of displacement will cause a flow of fluid through either one of conduits 11 and 12 to motor 13 and consequent rotation of the output of output shaft 24 of the motor 13.

When the motor 13 encounters a substantial load, pressure increases in the respective lines 11 or 12 and consequently increases the pressure transmitted from either one of ports 69 and 70 to the piston 52. An increase of that pressure above a predetermined level shifts the piston 52 in either one of the right or left directions as viewed in FIG. 1, and likewise shifts the pivot point 30 in the same direction. With the control lever 29 in a fixed position 32 becomes a fixed fulcrum point and lever 27 is pivoted about that point. This pivoting of lever 27 translates movement to servo-valve 46 and causes a consequent readjustment in the position of the servo-motor piston 37 and a change in the displacement of the pump 10 to thereby reduce the power or horsepower required to drive the pump.

The FIG. 3 embodiment works in a similar fashion but moves the swash plate only in a single direction.

While the present invention has been described with respect to specific embodiments, it is to be understood that numerous changes may be made in the illustrated embodiments without departing from the spirit and scope of the invention as defined in the appended claims.

We claim:

1. In a hydrostatic transmission having a variable displacement axial piston pump in continuous open fluid communication with a rotary hydraulic motor, a control system comprising:
    a servo-actuator operatively connected for varying the displacement of said variable displacement pump;
    a servo-valve for controlling said servo-actuator;
    manual control means for selectively positioning said servo-valve;
    pressure-responsive actuator means responsive to the pressure output of said pump for overriding said manual control means for reducing the displacement of said variable displacement pump; and,
    lever means for pivotally interconnecting said servo-valve, said manual control means, and said pressure-responsive actuator wherein the pivotal connection of said lever to said pressure-responsive actuator means serves as movable fulcrum means for moving said lever in proportion to the pressure output of said pump for overriding said manual control means.

2. The transmission of claim 1 wherein said control system comprises housing means defining a pair of parallel bores;
    said servo-actuator and said servo-valve are mounted in one of said bores and said pressure-responsive actuator is mounted in the other of said bores.

3. The transmission of claim 2 wherein said pressure-responsive actuator comprises double-acting piston means and means communicating the inlet of said pump to one side of said piston means and means communicating the outlet of said pump to the other side of said piston means.

4. The transmission of claim 3 wherein said pump is an over-center swash-plate type wherein reverse is achieved by swiveling the swash plate over center.

5. The transmission of claim 2 wherein said pressure-responsive actuator comprises single-acting piston means, and includes means for communicating the outlet of said pump to said piston means.

6. A hydraulic control system having a variable displacement axial piston pump, comprising:
    a servo-actuator operatively connected for varying the displacement of said variable displacement pump;
    a servo-valve for controlling said servo-actuator;
    manual control means for selectively positioning said servo-valve;
    pressure-responsive actuator means responsive to the pressure output of said pump for overriding said manual control means for reducing the displacement of said variable displacement pump; and,
    lever means pivotally interconnecting said servo-valve, said manual control means, and said pressure-responsive actuator means wherein the pivotal connection of said lever to said pressure-responsive actuator serves as movable fulcrum means, movable in response to the pressure output of said pump, for shifting said lever for overriding said manual control means.

7. The control system of claim 6 including housing means defining a pair of parallel bores;
    said servo-actuator and said servo-valve are mounted in one of said bores and said pressure-responsive actuator is mounted in the other of said bores.

8. The control system of claim 7 wherein said pressure-responsive actuator comprises double-acting piston means and means communicating the inlet of said pump to one side of said piston means and means communicating the outlet of said pump to the other side of said piston means.

9. The control system of claim 8 wherein said pump is an over-center swash-plate type wherein reverse is achieved by swiveling the swash plate over center.

10. The control system of claim 7 wherein said pressure-responsive actuator comprises single-acting piston means, and includes means for communicating the outlet of said pump to said piston means.

* * * * *

Disclaimer 3,918,259.—*Cyril W. Habiger* and *Donald L. Hopkins*, Joliet, Ill. HORSEPOWER-LIMITING VALVE AND LINKAGE THEREFOR. Patent dated Nov. 11, 1975. Disclaimer filed Dec. 5, 1983, by the assignee, *Caterpillar Tractor Co.*

Hereby enters this disclaimer to claims 1, 2, 5, 6, 7 and 10 of said patent.
[*Official Gazette January 31, 1984.*]